Dec. 8, 1931.  C. A. BARBIAN  1,835,745
ILLUMINATING DEVICE
Filed Oct. 7, 1929
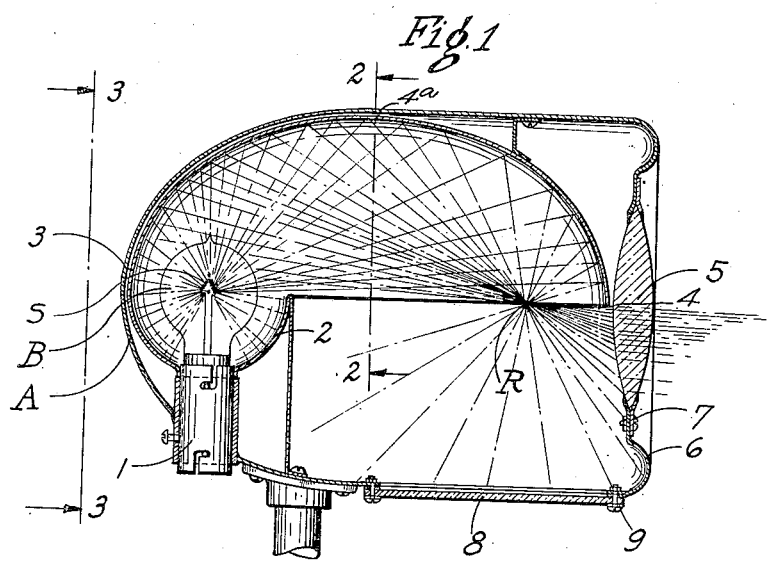
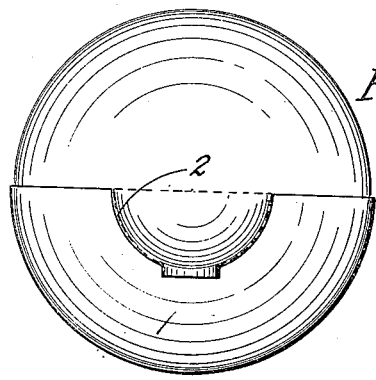
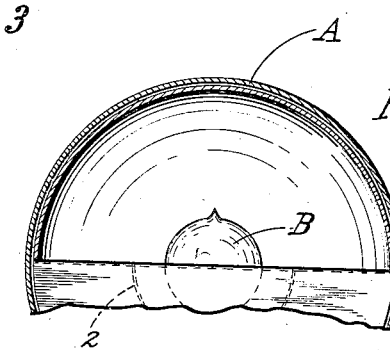
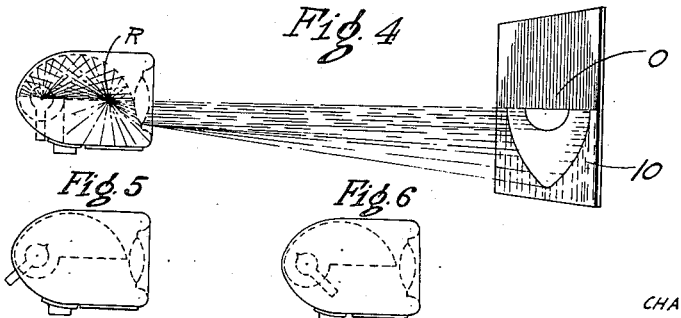
INVENTOR
CHARLES A. BARBIAN
BY
Richey & Watts
ATTORNEYS Patented Dec. 8, 1931

1,835,745

UNITED STATES PATENT OFFICE

CHARLES A. BARBIAN, OF AKRON, OHIO

ILLUMINATING DEVICE

Application filed October 7, 1929. Serial No. 397,853.

This invention relates to illuminating devices. While it may be employed in devices for stage lighting and building and sign flood lighting and for other similar purposes it is particularly applicable to use for motor vehicle head lighting purposes.

Present day developments in this art are, and have been, directed toward the provision of a lamp which will direct all of the light projected therefrom onto the surface of a road and not into the eyes of an approaching motorist. In striving for the achievement of the objective noted considerable difficulty has been experienced due to the fact that all the reflected rays from any one source of light and the direct rays from the same source do not come from a common point. It is to be remembered that it is necessary in a light of this type to avail of substantially all the light generated by the source for practical use and not to waste any through darkened spots or bands which merely serve to cut off certain portions of the light rays that ordinarily would blind another driver.

In view of the foregoing this invention has as its primary object the provision of optical instrumentalities which are associated with a light source to allow a major portion of the rays generated from the latter to pass through a single point. In carrying out this idea I make use of a hemispherical reflecting surface which is so disposed with respect to the light source that all of the rays of light reflected from the surface pass back through the source. An ellipsoidal reflecting surface is associated with the hemispherical surface and the light source so as to reflect all rays of light coming from the source which is disposed at one of the foci of the ellipse through the other focus thereof. This arrangement is based on the well known principle of elliptical reflecting surfaces that all rays passing through one focus of an ellipse are reflected back from the elliptical surface through the other focus.

Another objective of this invention of no little importance is the provision of suitable refracting instrumentalities for directing the light rays passing from the point (note the preceding paragraph) to a position tending toward parallelism. Moreover, by associating these instrumentalities in a particular manner, as contemplated by this invention only those light rays from the point which will be projected down on the road surface pass through the refracting instrumentalities and no light rays are projected above the horizontal. In attaining this end, it is of course necessary to cut off some of the light which would normally be directed above the horizontal line and constitute an annoyance for the motorist coming from the other direction. This invention, therefore, has, as one of its objects, the provision of suitable means whereby this cut off light is directed down on the road surface directly in front of the motor vehicle where it is not a nuisance factor. When all the constituents of my complete lamp are properly assembled the ellipsoidal reflecting surface not only serves to cause the light rays to pass through the given point but also constitutes a means for cutting off the light which would normally be projected above the horizontal and also a means for reflecting this light down onto the road surface directly in front of and beneath the vehicle.

With these and other more detailed objects and advantages in view as in part will be hereinafter stated the invention comprises certain novel constructions, combinations and arrangements in part as will be subsequently specified and claimed.

For a full and more complete understanding of this invention reference may be had to the following description and accompanying drawings wherein;

Figure 1 is a structure of a lamp made in accordance with my invention;

Figure 2 is a showing of the lamp as positioned in the ellipsoidal reflecting surface. This view is taken about on the line 2—2 of Figure 1;

Figure 3 is a view taken about on the line 3—3 of Figure 1;

Figure 4 is a diagrammatic showing illustrating the direction taken by light rays as they are controlled by the instrumentalities provided by this invention; and Figs. 5 and 6 are diagrammatic views showing modified mountings for the light source in an illuminating device resembling that of Figure 1.

Referring now to the drawings:

A support for the light source in the various reflecting instrumentalities is indicated at A. This member "A" is of a cup-like formation and may be made from any suitable material, preferably metal. Carried by the support "A" is a lamp "B" which constitutes the light source. Lamp "B" is of the conventional incandescent type and has a point "S" which is the effective light source of the lamp. It is detachably mounted in the support "A" by the socket arrangement indicated at 1.

A hemispherical reflecting surface 2 is carried by the socket portion 1 of the lamp "B" and this hemispherical surface merges into an ellipsoidal reflecting surface beginning with the point indicated at 3.

In devising the present invention I have taken recognition of certain principles of geometry. Firstly, that all rays of light eminating from a point located at the center of a spherical reflecting surface are reflected back through that point. Hence all rays of light coming from the source at "S" and striking the reflecting surface 2 are reflected back to the point "S". Secondly, the truth that all rays of light coming from a source which is located at one of the foci of an ellipsoid are reflected from the elliptical surface defined by the foci thereof through the other focus. In the arrangement described above all the rays of light coming from "S" which are direct rays and those reflected from the hemispherical reflector 2 must pass through a small area indicated at "R". The reflector surface from the point 3 is preferably half of an ellipsoid, that is, the elliptical reflecting portion extends to the point 4 which is located on the major axis of the ellipse, but if desired the eliptical surface may extend only to a point some little distance above point 4 or even stopped at point 4a.

Associated with the reflectors is a suitable lens 5 preferably of the double convex type which is held in position by the deformed portion 6 of the casing A and a clamp ring 7. This refracting member 5 may be of any suitable focal length necessary to cause the rays coming from the point "R" to take the desired direction. As parallelism of the rays is merely to be approached in the present embodiment the refracting member 5 will be properly designed for this purpose. Due to the presence of the reflecting surface above the point 4 in front of the upper half of the lens 5 all rays of light which are refracted by the lens will be directed either down on the road or parallel therewith and not up into the eyes of approaching motorists.

A piece of glass 8 may be located in the bottom of the supporting member "A" and held there in position in any suitable manner such as by the clamping arrangement shown at 9. Substantially all of the rays of light which are reflected by the surface through the point "R" and which do not pass through the lens 5 will be directed through the glass 8 down onto the surface of the road in front of the vehicle itself. This condition does not constitute a nuisance factor and yet affords beneficial results in lighting up the road for the automobile drivers coming from the other direction.

Directions taken by the light rays as are controlled by the various reflectors and lenses are clearly brought out in Figure 4. It is seen in this figure that all the rays coming through the point "R" reflected to the lens 5 merely light up the lower half of a spot "O" on the screen 10 leaving the upper half of the spot dark. The reflected light not passing through the lens 5 goes down through the glass 8 onto the road surface. By this arrangement only a very small amount of the light rays are wasted.

In Figure 5 the source of light which is a bulb is inclined at approximately 45 degrees so that the light rays which travel vertically downward will be reflected. This permits reflection of light rays from the bottom-most part of the reflector 2 which is not possible in the device of Figure 1 because the reflector 2 is cut away to receive the lamp socket.

Figure 6 shows another manner of mounting the light bulb, in this figure the bulb being inclined at about 45 degrees to the vertical and projecting through the front portion of the reflector 2 at about 90 degrees to the position shown in Fig. 5. The device of Figure 6 has the same advantage as that of Figure 5 so far as reflecting the vertical rays is concerned.

When any of the devices embodying this invention and including those above described is to be used for flood lighting, for example, in sign illumination the device may be mounted so that the light rays passing through the glass 8 will illuminate the sign. In such event the reflector 2 may be extended downwardly beyond the point 4 to prevent passage of the rays through the lens 5 or the lens 5 may be replaced by a metallic wall. Another manner for using the device for sign lighting is to mount the device so that the rays passing through lens 5 will illuminate remote parts of the sign while the rays passing through glass 8 will illuminate the adjacent parts of the sign.

By similar adaptations the device may be utilized for stage lighting in such a manner that it will not interfere with the vision of the audience or cast shadows about the actors' feet but on the contrary will illuminate the stage from the floor to a point well above the actors' head substantially uniformly.

The apparatus above described actually brings into substantially parallelism the rays reflected from the portion 2 of the reflector and the direct rays from the source of light to the portion of the reflector above point 3. These reflected and direct rays thus combine and become parallel reflected rays and the light energy is conserved and utilized to a marked extent. This refinement and action adapted to device of my invention to use as a projector.

What I claim is:—

In an illuminating device comprising a housing, a reflector supported within the housing, a light source supported within the housing and extending into the effective area of the reflector, said reflector comprising a semi-spherical portion and an ellipsoidal portion, one end of the ellipsoidal portion merging into the semi-spherical portion, said light source being disposed above the semi-spherical portion and below the ellipsoidal portion, an opening in said housing to permit the light to be reflected through the bottom thereof, an opening in the end of the housing and a refractory member disposed in the end opening to direct the rays.

In testimony whereof I hereunto affix my signature this 20th day of September, 1929.

CHARLES A. BARBIAN.